United States Patent Office 3,572,989
Patented Mar. 30, 1971

3,572,989
PROCESS FOR PRODUCTION OF CALCIUM HYPOCHLORITE
Seiji Tatara, Tokyo, and Toshio Mizukami, Makoto Nishonomiya and Shotaro Kiga, Niigata-ken, Japan, assignors to Nippon Soda Company Limited, Tokyo, Japan
No Drawing. Filed Apr. 7, 1969, Ser. No. 814,208
Int. Cl. C01b 3/04, 3/06
U.S. Cl. 23—86   5 Claims

ABSTRACT OF THE DISCLOSURE

A solution saturated with calcium hypochlorite and sodium chloride is added into an aqueous solution of sodium hydroxide and the mixed aqueous solution is chlorinated by chlorine gas. After chlorination of the solution, sodium chloride crystallized in the solution is separated, and then, calcium hydroxide is added into the reaction solution, the reaction solution is chlorinated and crystalline calcium hypochlorite is separated from the mother liquor and the mother liquor is used repeatedly for a diluent of initial reaction.

---

The present invention relates to improvements in a process for the production of calcium hyprochlorite and more particularly to a process in which chlorine gas can be fed speedily and sodium chloride can be separated easily.

It has long been known that calcium hypochlorite having good stability and solubility may be obtained by chlorination of calcium hydroxide and sodium hydroxide and many simple and complicated processes have been proposed. In a simple process calcium hypochlorite may be gained in low yields. In order to obtain a high quality finished product in satisfactory yields, the operation becomes very difficult and troublesome.

To obtain commercial grade calcium hypochlorite, it is necessary to remove sodium chloride which is formed by the chlorination of a concentrated mixture of calcium hydroxide and sodium hydroxide.

For this purpose, the chlorination is carried out in the state in which the mixture is diluted with a lot of water, i.e., enough to dissolve sodium chloride formed in the reaction and then calcium hypochlorite is separated from the liquor containing sodium chloride. However, the yield of calcium hypochlorite is lowered by a dissolution into mother liquor.

Another process has been proposed to provide a good yield, in which sodium hypochlorite and sodium chloride are formed by chlorination of thick aqueous sodium hydroxide and the crystallizing sodium chloride in the solution is separated from the reaction solution in a first step and then calcium hydroxide is added into the reaction solution in a second step. This process gives a very high yield but, on the other hand, it has some of the following drawbacks in the first step:

(A) Chlorination is carried out very slowly and requires a long time.

(B) Viscosity becomes higher according to the progress of the chlorination and the yield based on chlorine is reduced because a homogeneous chlorination is difficult to obtain.

(C) Crystals of sodium chloride formed in the reaction are microcrystal and are very difficult to filter off and a lot of sodium hypochlorite is taken off with micro sodium chloride crystals.

(D) Sodium hypochlorite in the mother liquor is unstable and it can not keep long.

Those drawbacks will be improved if the thick sodium hydroxide is diluted with water. However if the thick sodium hydroxide is diluted, sodium chloride cannot be isolated and advantages of using thick sodium hydroxide are cancelled.

Accordingly, it is the object of this invention to overcome the aforementioned problems and disadvantages.

It is another object of this invention to provide a process having a high yield based on sodium hydroxide.

It is still another object of the invention to provide a process in which the reaction rate of chlorine is rapid and a homogeneous reaction is completed without side reactions.

It is another object of the invention to make sodium chloride crystals large enough to separate off by easy centrifugal separation or filtration.

Other objects and advantages of this invention will become further apparent from the following detailed description.

The inventors have found, and this invention is based largely upon the discovery, that the mother liquor gained in the second step is much more suitable for a diluent of the reaction of the first step notwithstanding each reaction in the two steps differ from each other.

The present invention comprises two steps:

In the first step, a thick sodium hydroxide aqueous solution, preferably containing more than 50% of sodium hydroxide solution, or solid sodium hydroxide is added into the mother liquor gained in the second step. Instead of the mother liquor, an aqueous solution which is saturated with sodium chloride and calcium hypochlorite can be used.

The mixture is chlorinated by introducing chlorine gas, and sodium hypochlorite and sodium chloride are formed in the reaction mixture and crystalline sodium chloride is separated from the mixture.

In the first step the thicker that the sodium hydroxide used becomes, the better it is for the invention to be carried out because of the reduction in amount of waste solution.

The mother liquor gained in the second step, as the diluent or solvent of sodium hydroxide, is used in about six to eleven-fold for sodium hydroxide and chlorine gas is let in just before the point necessary to keep the reaction mixture in alkaline condition.

In the second step, above 35% of lime milk or slaked lime and water are added to the reaction mixture and the reaction mixture is adjusted so as to include calcium hydroxide in an amount corresponding to the amount of sodium hypochlorite and sodium hydroxide, and preferably by means of controlling the total amount of water introduced in the reaction system. The reaction mixture is adjusted so that after chlorination the mixture will contain about 58% to about 68% of water. The mixture is then chlorinated by introducing chlorine gas just before the point necessary to keep the solution alkaline and after the chlorination the reaction mixture is kept on the alkaline side. Neutral calcium hypochlorite growing into large square plate crystals is isolated with a small amount of sodium chloride crystals from the mother liquor and the recovered calcium hypochlorite crystals are dried as finished materials.

In this process, the mother liquor gained in the second step is not exactly the diluent of the first step in the strict sense because reactions occur by the addition of sodium hydroxide in the mother liquor and the reactions differ from the reactions of the first steps of prior art process, however the reactions occurring in the present process never cause any hinderance.

The reactions are as follows.

(a) In the prior art process, NaOH and $Cl_2$ make NaClO and NaCl.

$$2NaOH + Cl_2 \rightarrow NaClO + NaCl + H_2O \quad (1)$$

In the present invention, in the first step one part or all of the NaOH react with $Ca(ClO)_2$ contained in the mother liquor and $Ca(OH)_2$ and NaClO are formed.

$$2NaOH + Ca(ClO)_2 \rightarrow Ca(OH)_2 + 2NaClO \quad (2)$$

Then the $Ca(OH)_2$ reacts with $Cl_2$ and forms $Ca(ClO)_2$ and $CaCl_2$.

$$Ca(OH)_2 + Cl_2 \rightarrow \tfrac{1}{2}Ca(ClO)_2 + \tfrac{1}{2}CaCl_2 + H_2O \quad (3)$$

Further, there is a double decomposition between $CaCl_2$ and NaClO which makes $Ca(ClO)_2$ and NaCl.

$$NaClO + \tfrac{1}{2}CaCl_2 \rightarrow \tfrac{1}{2}Ca(ClO)_2 + NaCl \quad (4)$$

If all above mentioned Formulas 2, 3 and 4 are summarized, the result is similar to Formula 1 in which NaOH is made to react with $Cl_2$ and whereby NaClO and NaCl are produced. In other words, the added mother liquor is said to be a mere diluent which does not suffer any change. In the second step, added $Ca(OH)_2$ is chlorinated with $Cl_2$, and $Ca(ClO)_2$ and $CaCl_2$ are formed.

$$Ca(OH)_2 + Cl_2 \rightarrow \tfrac{1}{2}Ca(ClO)_2 + \tfrac{1}{2}CaCl_2 + H_2O$$

Then NaClO formed in the first step reacts with $CaCl_2$ and makes NaCl and $Ca(ClO)_2$.

$$2NaClO + CaCl_2 \rightarrow 2NaCl + Ca(ClO)_2$$

(b) Liquid compositions obtained by the reactions vary with the conditions of reactions. In one case sodium hydroxide is chlorinated alone and in another case above chlorination is carried on in the presence of the mother liquor.

In the former case the composition consists of two components, i.e. sodium hypochlorite and sodium chloride, whereas in the latter case the composition consists of calcium hypochlorite, sodium hypochlorite and sodium chloride. The amounts of isolated sodium chloride and calcium hypochlorite differ from the amounts of known process and depend on solubilities and equilibrium conditions of three components, i.e. calcium hypochlorite, sodium hypochlorite and sodium chloride. As the results of investigations made by the inventors in the case of three components, the amount of crystallized sodium chloride in the first step is not changed remarkably even if it becomes somewhat large and, as for calcium hypochlorite, when sodium chloride is isolated in the first step calcium hypochlorite reaches super saturation and a very little amount of calcium hypochlorite precipitates in the course of a long time.

However, immediate separation of sodium chloride after the chlorination reactions in the first step avoids lower yields of calcium hypochlorite from loss with isolated sodium chloride crystal and loss of calcium hypochlorite does not arise to any extent at the sodium chloride separation.

In the present process, instead of the mother liquor, an aqueous solution saturated with sodium chloride and calcium hypochlorite may be used.

Further, the reaction can be carried out in a batchwise manipulating operation, a continuous automatic operation or in other kinds of operations. In the continuous operation, the reaction in the first step is carried out in such a manner that a mixture solution consisting of an aqueous solution of NaOH and the mother liquor from the second step and chlorine gas are continuously introduced into a reactor.

As a method of adjusting the reaction in the first step, for example, an electrode may be inserted into the reactor to continuously measure the oxidation-reduction potential in the reaction solution and thereby the amount of the mixed solution and chlorine introduced can be automatically controlled so that a definite potential difference may be constantly maintained.

Further, the reaction solution may be continuously exhausted from the reactor and thereby the exhausted amount in proportion to flow rate of chlorine or the mixed solution or both may be constantly kept at a definite ratio or the stagnating amount in the reactor may be constantly maintained. Thus, automatic control can be easily practised. The sodium chloride crystal has a remarkably large size and is grown in the range of 100 to 1,000 microns and its separation is easily practised.

Therefore, even if some amount of calcium hypochlorite is simultaneously separated, sodium chloride alone can be isolated by means of a sedimentation separation or by using a filtering cloth of rough mesh. This filtrate is mixed with lime milk in the reactor in the second step and the resulting mixture is further chlorinated and thereby neutral calcium hypochlorite which is easily centrifugalized and has a rectangular plate crystal in the range of 30 to $70\mu$ can be produced in high yield.

The advantages of the invention are numerous.

The viscosity of the reaction system is reduced and thereby agitation and other operating conditions are facilitated and the reaction is homogeneously carried out, and an absorptive velocity of chlorine is increased and a formation of side reactions is decreased.

Sodium chloride is crystallized in large sizes, particularly in the case of a continuous system. In addition, the stability of the sodium hypochlorite is increased and its decomposition rate is reduced.

In order to give those skilled in the art a better understanding of the invention the following illustrative examples are given:

EXAMPLE I 12 liters of mother liquor gained in the second step which consists of calcium hypochlorite (concentration: 10 percent) and sodium chloride (concentration: 20 percent) was added to an aqueous solution of sodium hydroxide (concentration: 50 percent) and chlorination was carried out at 20° C.

An absorptive rate of chlorine was in the range of 3 to 5 g./min., i.e. in the range of 3 to 5 times for said rate in the chlorination free from addition of the mother liquor. A reaction time of chlorination with 1.28 kg. of $Cl_2$ was reduced to about one third. On the other hand, the reaction solution showed a viscosity of 10 cp. or less, i.e. about one tenth or less of viscosity free from addition of the mother liquor and an agitation was easily practised. The side reaction caused was very small. A yield based on the raw material $Cl_2$ showed 98.5 percent.

As a result of the reaction, 19.42 kg. of solution containing sodium hypochlorite (6.8 percent), calcium hypochlorite (7.8 percent) and sodium chloride (21.1 percent) was obtained. 1.01 kg. of sodium chloride having a crystal of 20 to 50 microns was isolated in said solution.

Compared with the conventional process, the above crystal size was about ten times the size of prior art processes and the centrifugalizing time was about one third and further a removal of solution was favorably practised and the content of effective chlorine based on calcium hypochlorite in the crystal sodium chloride showed 1.5 percent or less without detergence. A loss of effective chlorine showed ½ or less. Further, the filtrate was stabilized and durable for storage for a long period and a reducing rate of effective chlorine was reduced to about one tenth or less.

A concentration of 38 percent $Ca(OH)_2$ was added to 10 liters of the above filtrate and the resulting mixture was chlorinated at 20° C. until obtaining one percent or less of residual alkali component and the crystal separated was centrifugalized. Then, 1.9 kg. of crystal and 10.5 liters of mother liquor was obtained.

This crystal was a mixture which consisted of neutral calcium hypochlorite with rectangular plate crystals in the range of 30 to 70 microns and some amount of crystalline. The finished product containing 77 percent of effective chlorine was obtained by drying it. Further, the mother liquor contained about 10 percent of calcium hypochlorite and about 20 percent of sodium chloride and was employed as a diluent in the first step. The above mother liquor showed the same effect as the mother liquor in the reaction of the second step which was primarily used in this example.

What we claim is:

1. A cyclic process for producing calcium hypochlorite from sodium hydroxide and calcium hydroxide by chlorination with chlorine gas, which comprises the steps of:
   (a) adding sodium hydroxide as a solid or as a thickly concentrated aqueous solution into an aqueous solution saturated with calcium hypochlorite and sodium chloride;
   (b) chlorinating the mixture obtained in step (a) with chlorine gas to produce crystalline sodium chloride and an aqueous chlorinated reaction mixture;
   (c) isolating the formed crystalline sodium chloride as large crystals in the size range of 100–1000 microns from said aqueous chlorinated reaction mixture;
   (d) feeding calcium hydroxide into the aqueous chlorinated reaction mixture remaining after separation of said crystals therefrom;
   (e) chlorinating the mixture containing the added calcium hydroxide with chlorine gas to produce crystalline calcium hypochlorite and a mother liquor saturated with calcium hypochlorite and sodium chloride;
   (f) recovering the crystalline calcium hypochlorite from the said mother liquor; and
   (g) recycling the mother liquor to step (a).

2. The process of claim 1 wherein the sodium hydroxide is added as an aqueous solution having a concentration of NaOH greater than 50% by weight.

3. The process of claim 1 wherein the crystalline calcium hypochlorite in step (f) is neutral and is in the form of large rectangular plate crystals in the range of about 30 to 70 microns.

4. The process of claim 1 wherein the reaction is always kept on the alkaline side during the process steps.

5. The process of claim 1, wherein the amount of water introduced into the reaction system as a result of the reaction obtained by chlorinating the calcium hydroxide containing mixture is controlled to be between about 58% and about 68%.

References Cited
UNITED STATES PATENTS

| | | | |
|---|---|---|---|
| 1,787,048 | 12/1930 | MacMullin et al. | 23—86 |
| 2,441,337 | 5/1948 | Sprauer | 23—86 |
| 3,094,380 | 6/1963 | Bruce | 23—86 |
| 3,251,647 | 5/1966 | Nicolaisen | 23—89X |

EDWARD STERN, Primary Examiner

U.S. Cl. X.R.

23—89